US012747144B2

(12) United States Patent
Contessini et al.

(10) Patent No.: US 12,747,144 B2
(45) Date of Patent: Sep. 29, 2026

(54) MULTIFUNCTIONAL LIFTING VEHICLE AND RELATIVE SMART DISPLAY DEVICE

(71) Applicant: Merlo Project S.r.l., Cervasca Cuneo (IT)

(72) Inventors: Felice Contessini, Cervasca Cuneo (IT); Federico Lopez, Cervasca Cuneo (IT)

(73) Assignee: Merlo Project S.r.l., Cervasca Cuneo (IT)

( * ) Notice: Subject to any disclaimer, the term of this patent is extended or adjusted under 35 U.S.C. 154(b) by 13 days.

(21) Appl. No.: 18/738,553

(22) Filed: Jun. 10, 2024

(65) Prior Publication Data

US 2024/0409380 A1 Dec. 12, 2024

(30) Foreign Application Priority Data

Jun. 12, 2023 (IT) ........................ 102023000011913

(51) Int. Cl.
*B66F 9/065* (2006.01)
*B66F 9/075* (2006.01)

(52) U.S. Cl.
CPC .......... *B66F 9/0655* (2013.01); *B66F 9/0755* (2013.01); *B66F 9/0759* (2013.01)

(58) Field of Classification Search
CPC .... B66F 9/0655; B66F 9/0755; B66F 9/0759; B66F 17/003; B60K 2360/177; B60K 2360/61; B60K 35/23; B60Y 2200/15; E02F 9/264; G02B 27/01; G02B 27/0179
USPC ............................................................ 701/50
See application file for complete search history.

(56) References Cited

U.S. PATENT DOCUMENTS 4,516,116 A * 5/1985 White .................... G01G 23/36 340/685
2010/0100338 A1* 4/2010 Vik ..................... G01M 5/0033 702/42
2010/0204891 A1* 8/2010 Biggerstaff ........... E02F 9/2033 701/50
2012/0321422 A1* 12/2012 Borghi .................. B66F 17/003 414/663

(Continued)

FOREIGN PATENT DOCUMENTS

EP 1312579 A2 5/2003
EP 2520536 A1 11/2012

(Continued)

OTHER PUBLICATIONS

Search Report and Opinion dated Dec. 12, 2023. 10 pages.
Search Report dated Jun. 20, 2024. 10 pages.

*Primary Examiner* — Tuan C To
*Assistant Examiner* — Dominick Mulder
(74) *Attorney, Agent, or Firm* — RMCK Law Group PLC

(57) ABSTRACT

A multifunctional lifting vehicle includes a base frame, a lifting assembly including at least one operating arm equipped with an attachment for mounting a tool, a drive system for activating said lifting assembly, and a control system associated with said drive system. The control system includes an electronic control unit operatively connected to a plurality of sensors arranged to acquire a plurality of vehicle stability data, including a position of the arm with respect to the base frame and a mass of a lifted load. The vehicle further includes a smart display device operatively connected to said electronic control unit to display a load diagram of the vehicle.

9 Claims, 4 Drawing Sheets

(56) References Cited

U.S. PATENT DOCUMENTS

2014/0190046 A1* 7/2014 Shibata .................. E02F 9/264
701/50
2015/0352956 A1* 12/2015 Miuchi ............. B62D 15/0295
701/41
2016/0236922 A1* 8/2016 Merlo ................ B66F 9/07559
2018/0229988 A1* 8/2018 Gault .................... B66F 17/003
2018/0252921 A1* 9/2018 Rantala ................ G06F 3/0487
2019/0019429 A1 1/2019 Palberg et al.
2019/0031474 A1* 1/2019 Stilborn .................. B66C 23/00
2020/0042791 A1* 2/2020 Fujinoi .................. H04N 5/272
2020/0247412 A1* 8/2020 Wang ..................... G02B 27/01
2021/0024332 A1* 1/2021 Iotti ........................ B66F 9/065
2021/0087794 A1* 3/2021 Yamamoto ................ B60R 1/27
2021/0107360 A1 4/2021 Iotti
2021/0300741 A1* 9/2021 Iotti ...................... B66F 9/0755
2022/0113546 A1* 4/2022 Firintepe ................. G06F 3/012
2022/0152468 A1* 5/2022 Ito .......................... G06V 10/94
2023/0098211 A1* 3/2023 Ito ........................... E02F 3/431
701/50
2023/0161406 A1* 5/2023 Kobayashi ............. G06F 3/012
345/156
2023/0251497 A1* 8/2023 Lv .......................... G02B 27/01
2023/0365388 A1* 11/2023 Damania ............... B66F 9/0755
2024/0067506 A1* 2/2024 Gnagey ................... B66C 13/46
2024/0278643 A1* 8/2024 Lu .......................... B60K 35/00

FOREIGN PATENT DOCUMENTS

IT 202100023042 A1 3/2023
WO 2019115869 A1 6/2019

* cited by examiner

MULTIFUNCTIONAL LIFTING VEHICLE AND RELATIVE SMART DISPLAY DEVICE

CROSS-REFERENCE TO RELATED APPLICATION

This application claims priority to Italian Patent Application No. 102023000011913 filed Jun. 12, 2023. The disclosure of the above application is incorporated herein by reference in its entirety.

FIELD OF THE INVENTION

The present invention relates to a multifunctional lifting vehicle comprising

- a base frame,
- a lifting assembly including at least one operating arm equipped with an attachment for mounting a tool,
- a drive system for activating said lifting assembly,
- a control system associated with said drive system,
- wherein said control system comprises an electronic control unit operatively connected to a plurality of sensors arranged to acquire a plurality of vehicle stability data, including the position of the arm with respect to the base frame and the mass of the lifted load.

PRIOR ART

A vehicle of the above type is described in document IT 2021 0002 3042 A1. These vehicles may be equipped with different types of tools, such as for example forks, shovels, aerial platforms, etc. During operation, the load applied to the tool located at the end of the arm may vary widely.

In accordance with current regulations, lifting vehicles of this type are equipped with a load diagram which prescribes the maximum load that can be applied to the end of the lifting arm depending on the position of the arm. The need for a load diagram, in graphical or tabular form, is a peculiarity of lifting machines, the capacity of which may vary according to the spatial positioning of the lifting means and the load lifted, as well as its size, or other elements concerning a specific operating configuration of the vehicle itself. In this regard, in addition to the type of supports on the ground, the extension and shape of the support plant and the speed of movement, it is also necessary to consider the specific tool installed. The load diagram is determined in order to comply with the standard safety regulations relating to the stability of the machine, thus defining the working conditions that ensure the stability of the vehicle against overturning.

Various solutions are now known for displaying such diagrams, starting from the more traditional ones consisting of a simple paper support, up to more advanced digital methods that make use of screens, for example, fixed screens placed in the position occupied by the operator inside the control cab of the vehicle. According to a now consolidated technique, compliance with the load diagram is entrusted to the machine control system.

The techniques used up to now are, however, not without some drawbacks, among which the fact that the operator has to look away from the useful information when maneuvering the machine, whether he is in the cab, on the platform, or using a radio-controlled device to remotely control the vehicle.

The need is therefore felt to propose an improving solution that can overcome the aforesaid drawbacks.

OBJECT OF THE INVENTION

The aim of the present invention is to overcome the technical problems previously described.

In particular, one object of the present invention is to create a lifting vehicle configured to propose an alternative display of the relevant load diagram.

A further object of the invention is to implement this solution with relatively simple and low-cost means, without requiring particular modifications to a lifting vehicle in standard configuration with display of the load diagram according to the methods used today.

SUMMARY OF THE INVENTION

The object of the present invention is achieved by a lifting vehicle having the characteristics forming the subject of one or more of the claims that follow, which form an integral part of the technical disclosure given here in relation to the invention.

In particular, the object of the invention is achieved by a multifunctional lifting vehicle having the characteristics indicated in the attached claim 1.

The invention is also directed to a method for displaying a load diagram as indicated in the attached claim 8.

BRIEF DESCRIPTION OF THE FIGURES

Further characteristics and advantages of the invention will become apparent from the description that follows with reference to the attached drawings, provided purely by way of non-limiting example, wherein.

DETAILED DESCRIPTION OF THE EMBODIMENTS OF THE INVENTION

In the following description various specific details are illustrated aimed at a thorough understanding of examples of one or more embodiments. The embodiments may be implemented without one or more of the specific details, or with other methods, components, materials, etc. In other cases, known structures, materials or operations are not shown or described in detail to avoid obscuring various aspects of the embodiments. The reference to "an embodiment" in the context of this description indicates that a particular configuration, structure or characteristic described in relation to the embodiment is included in at least one embodiment. Therefore, phrases such as "in an embodiment", possibly present in different places of this description do not necessarily refer to the same embodiment. Moreover, particular conformations, structures or characteristics can be combined in a suitable manner in one or more embodiments and/or associated with the embodiments in a different way from that illustrated here, for example, a characteristic here exemplified in relation to a figure may be applied to one or more embodiments exemplified in a different figure.

The references illustrated here are only for convenience and do not therefore delimit the field of protection or the scope of the embodiments.

Figures 1, 2:
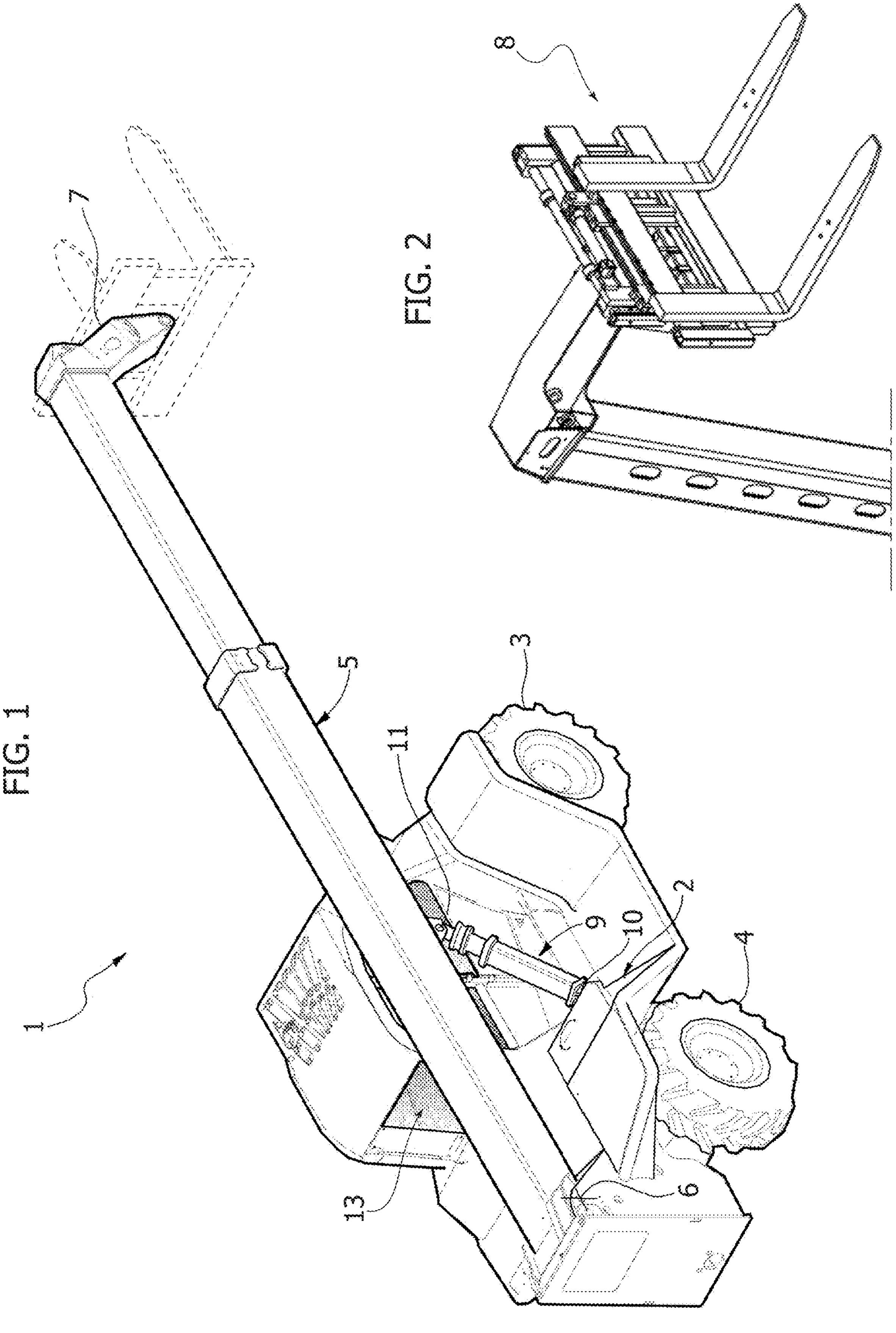
FIG. 1 is a perspective view of a multifunctional lifting vehicle according to an embodiment of the present invention.
FIG. 2 is an enlarged view of a tool connected to a telescopic arm of the vehicle illustrated in the previous Figure.

With reference to FIG. 1, numeral 1 indicates a multi-functional lifting vehicle according to a preferred embodiment of the present invention. The vehicle 1 includes a base frame 2 equipped with front support means 3 and rear support means 4, for example, wheels and/or stabilizers. The base frame 2 may be advantageously made in the form of a fixed, self-propelled or rotating frame.

The vehicle 1 also comprises a lifting assembly 5 having at least one operating arm articulated in the rear section of the frame 2 about a transverse axis 6. The lifting assembly 5 may advantageously comprise a single operating arm or two arms articulated together. One or more of said arms may be telescopic configured so as to vary their prominence with respect to the base frame 2.

Again with reference to FIG. 1, the actuation assembly 5 is equipped at one of its terminal ends with an attachment 7 for connecting different types of tools 8, such as for example, forks, shovels, aerial platforms, etc. Purely by way of example, FIG. 2 comprises an example of a tool 8, in particular a fork shifter, connected to a telescopic arm.

The vehicle 1 further comprises a drive system configured to operate the lifting assembly carrying the tool 8. In one or more embodiments the drive system comprises at least one lifting/lowering cylinder 9 with ends articulated to the frame 2 and to the arm about the respective axes 10, 11.

The arm is also advantageously equipped with a cylinder (not shown), which controls the telescopic extension and retraction movement of the arm 5. In one or more embodiments, the drive system may further comprise a hydraulic drive circuit including a main pump driven by a motor of the vehicle. The details relating to the hydraulic circuit are not described here, as they are widely known to the expert in the field in question.

Figure 3:
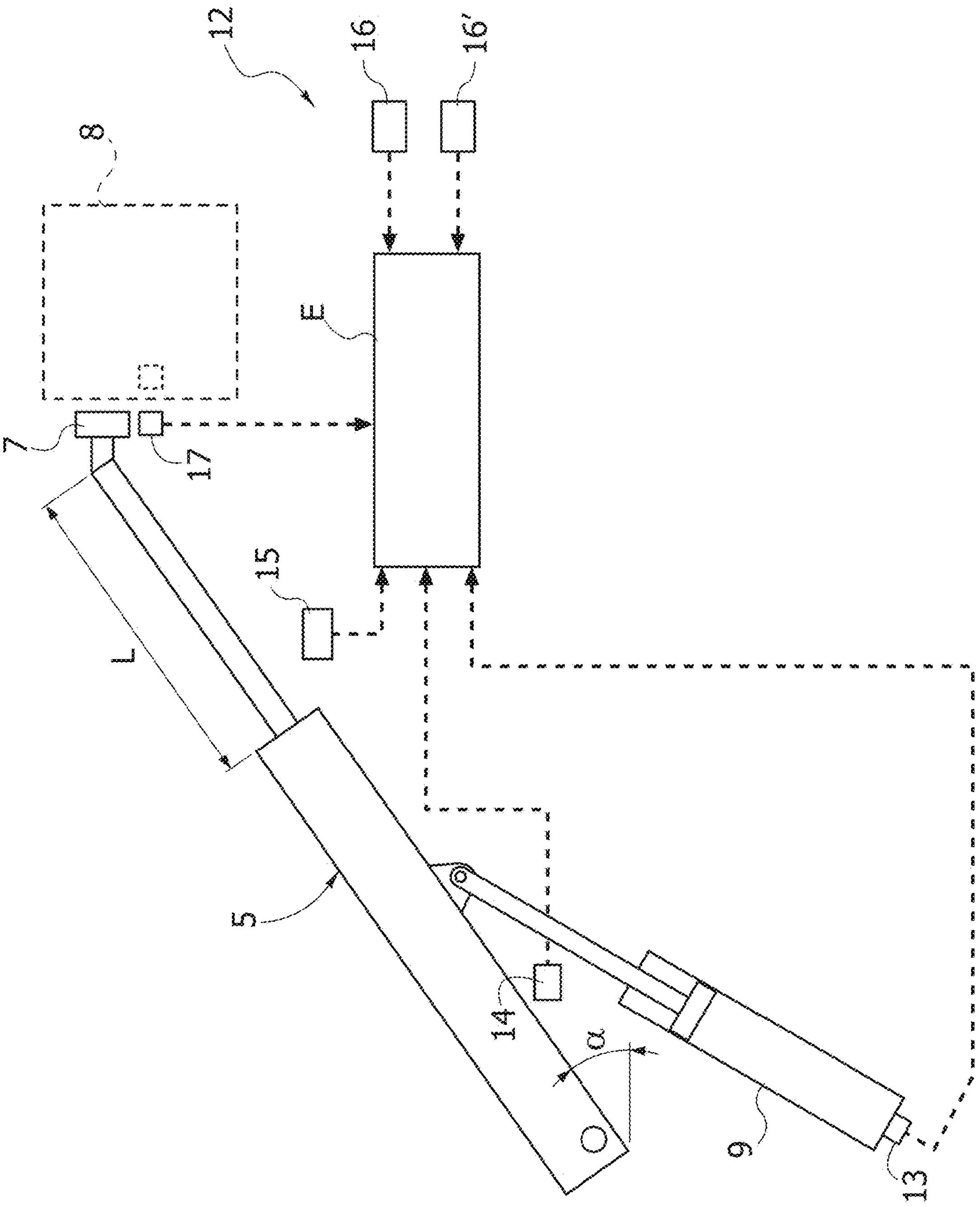
FIG. 3 is a simplified diagram of the control circuit of the vehicle illustrated in the previous figures.

FIG. 3 is a simplified diagram showing a control system 12 associated with the drive system of the vehicle 1. The control system 12 is arranged to control, among other things, respective operating valves of a hydraulic circuit.

In one or more embodiments, the control system 12 comprises a load sensor 13, which provides an indication of the intensity of the load applied to the arm. The load sensor 13 may, for example, be made in the form of a load cell applied to the lifting/lowering cylinder 9.

The control system 12 may also comprise sensors 14, 15 which detect, respectively, the inclination angle of the arm (indicated with a) and the extension length L of the telescopic portion of the arm 5 (also called extension). The control system 12 further comprises one or more sensors 16 to detect the load on the supports 3 and/or 4 of the vehicle 1 and possibly other sensors 16' present on the vehicle 1 to detect, for example, the extension of the stabilizers and the rotation angle of an upper frame portion. The control system 12 may also comprise a recognition unit 17 configured for recognizing the type of tool 8 applied to the arm 5. The recognition unit 17 may, for example, be based on RFID technology.

According to a further characteristic illustrated in FIG. 3, the control system 12 comprises an electronic control unit E that can be configured to autonomously define a load diagram of the vehicle 1 based on various operating parameters of the vehicle, including those detected by the sensors present on board the vehicle (for example, the load applied to the arm), and the type of connected tool. The load diagram provides an indication of the maximum load that can be transported at the end of the telescopic arm depending on the position of the arm with respect to the vehicle, as well as the amount of the load lifted, and further parameters that concern a specific operating configuration of the vehicle itself (the type of supports on the ground, the extension and shape of the support plant, the speed of movement and the specific tool installed).

The load diagram schematically shows an operating working area that allows the operator to safely control the vehicle. In fact, the expression working area means a safe operating space, having known the load on the tool and the type of connected tool, as well as any other parameters as indicated above. The working area may be displayed with related sub-areas, in particular:

area with permitted operations (for example, displayed in green color);

area with operations close to the permitted limit (for example, displayed in yellow); and area with prohibited operations (for example, displayed in red).

Preferably, the load diagram displays two working areas represented according to a schematic side view and a schematic plan view.

Figure 4:
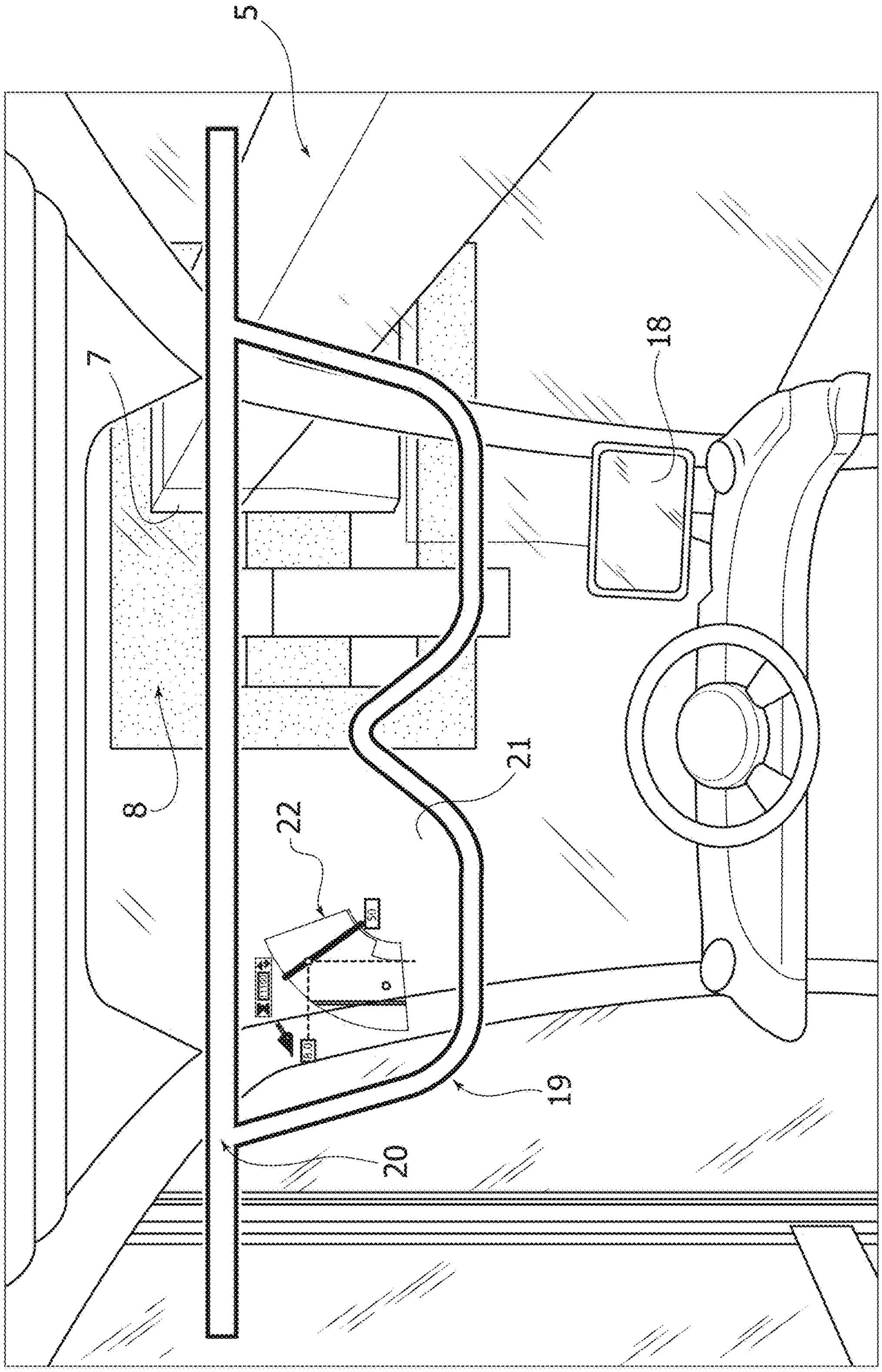
FIG. 4 is a schematic view of a smart display device included with the vehicle according to the present invention and used by an operator inside the control cab.
Figure 5:
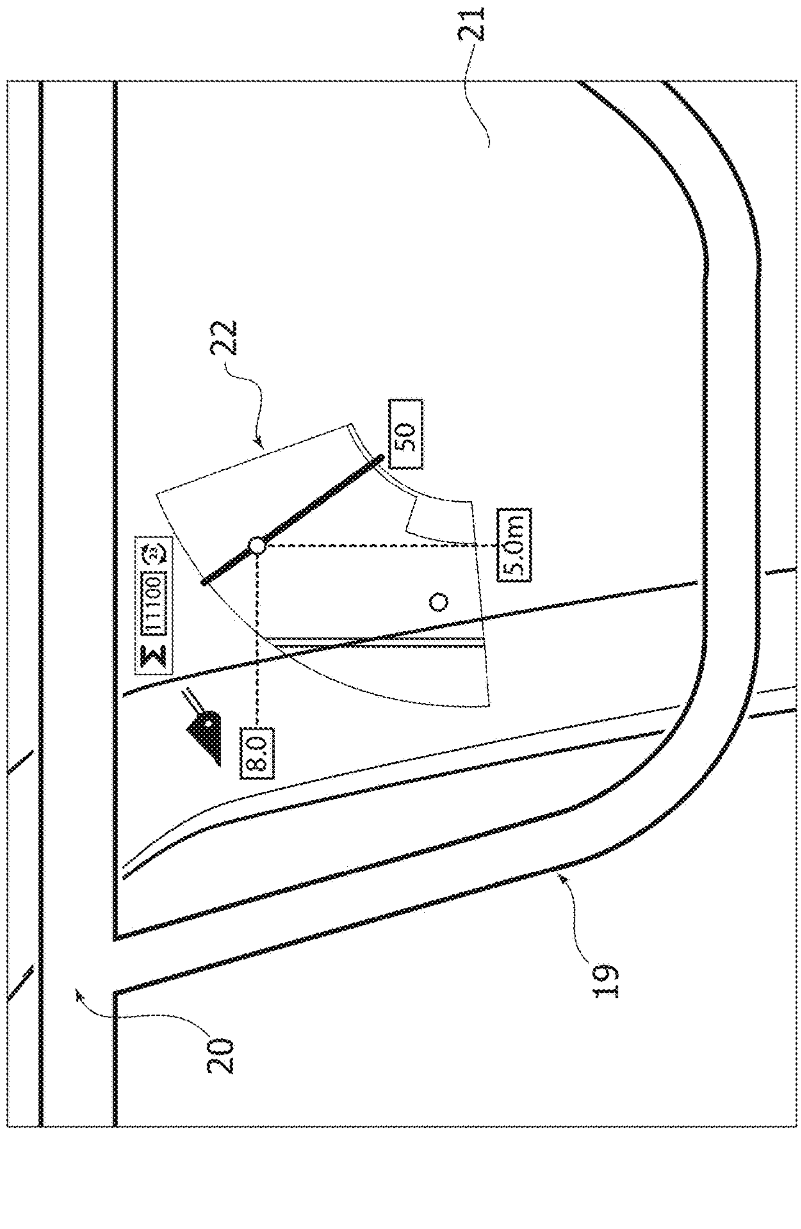
FIG. 5 is an enlarged scale view illustrating some details of the smart display device.

According to an essential characteristic of the present invention, illustrated by way of example in FIGS. 4,5, the lifting vehicle 1 also comprises a smart display device 19 made in the form of smart-glasses wearable by an operator who controls the vehicle 1.

The smart display device 19 made in the form of smart glasses is operationally connected to the electronic control unit E of the vehicle 1.

As will be appreciated below, the device 19 allows a plurality of information to be displayed before the eyes, without the driver taking his gaze away from the space in front of the vehicle.

In one or more embodiments, the display device 19 made in the form of smart glasses comprises a frame 20 wearable by the operator, which supports at least one lens 21 for displaying the aforesaid information.

The device 19 also comprises an electronic processor (not shown) operationally in communication with the electronic unit E of the vehicle 1 to receive stability data acquired through the sensors present on board the vehicle.

In this regard, in one or more embodiments, the smart display device 19 is configured to receive from the electronic unit E of the vehicle a plurality of data relating to the stability of the vehicle, on the basis of the operating conditions of the vehicle, process said data using said processor to determine a load diagram of the vehicle, and display the load diagram in real time during use of the vehicle. Therefore, in other words, the generation of the load diagram is carried out directly by the smart display device 19 following the reception of a plurality of data from the electronic unit E of the vehicle.

In other embodiments, the smart display device 19 is configured to receive from the electronic unit E of the vehicle the already processed data configured for generating the vehicle load diagram. Therefore, in other words, the generation of the load diagram is carried out by the electronic unit E of the vehicle—as the latter is configured and programmed to generate the load diagram and possibly display it on an interface device, for example, the inside the vehicle control cab, while the smart display device 19 is programmed to acquire the result of the processing already carried out and display the relevant diagram.

In all embodiments, the vehicle 1 is therefore set up to acquire, through the sensors, data relating to the stability during the maneuvers carried out (for example, information on the type of tool mounted on the arm, the information collected by the various control sensors of the geometry of the arm and weighing of the load carried by the arm); these data will be automatically transmitted, for example via Wi-Fi, to the smart display device 19—with or without preliminary processing by the electronic unit E-, thus reproducing the main information useful to the operator in superimposition on the lens 21.

Figure 6:
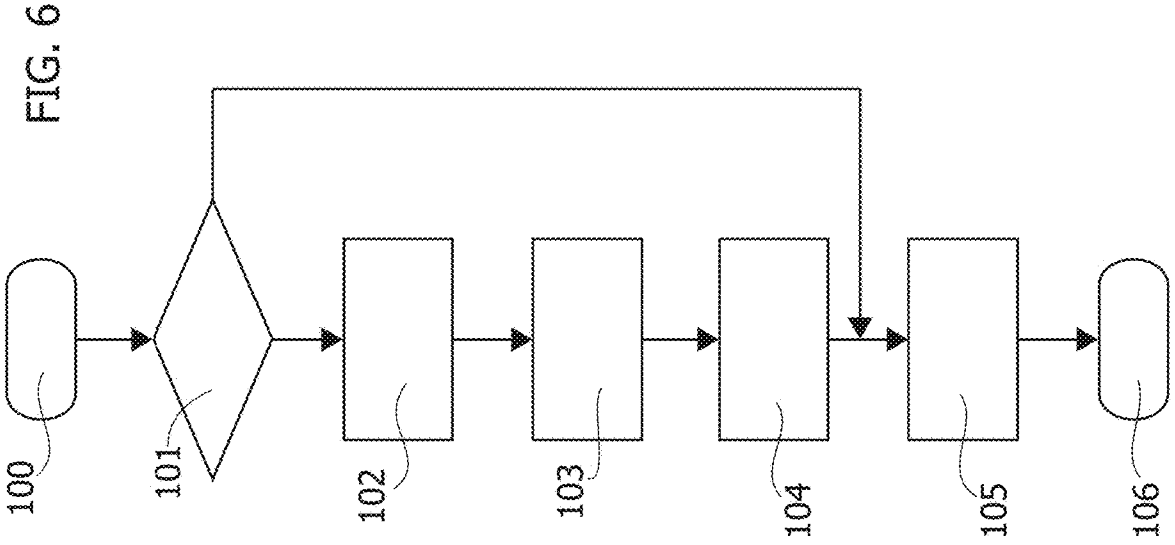
FIG. 6 is a flow chart illustrating a sequence of operation of the smart display device illustrated in the previous figures.

Note that the load diagram 22 illustrated in FIGS. 5, 6 is purely intended to illustrate the principle of the invention and the values depicted are clearly likely to vary depending on the type of vehicle and operating conditions.

Therefore, through the smart display device 19, the operator is constantly informed in real time on the state of longitudinal and transversal stability of the vehicle, viewing the load diagram, so as to be able to operate in complete safety up to the limit of the vehicle's capabilities, without therefore risking incurring maneuver errors caused by reading the load diagram on devices that are misaligned with respect to the operator's field of vision when the latter observes the scenario surrounding the vehicle, during the maneuvers given.

The operator will constantly have before his eyes the main information necessary to operate the machine, also leaving a screen 18—inside the cab—free for other uses such as, for example, viewing what is acquired by a camera for reversing mounted on the vehicle.

Advantageously, the present invention also lends itself to its application in the case of vehicles controlled remotely, by an operator positioned outside the vehicle's control cab, who is for example on the ground on which the vehicle moves, in a position of safety distanced from the vehicle, or on a platform connected to the end of the vehicle arm. An operator may, therefore, wear the device 19 in the form of smart glasses, and remotely control the vehicle, for example, via a remote control device or via controls positioned on the platform, continuing to check—in real time—the load diagram displayed by the device 19.

In light of the characteristics described previously, FIG. 6 shows a flow diagram illustrating the operation of the vehicle 1 and the related smart display device 19, according to an embodiment:

- block 100 shows the start of operations to use the vehicle and the related smart display device;
- block 101 shows the possibility of wearing the smart display device;
- if not, block 105 illustrates the start of the load lifting operations;
- if so, block 102 illustrates the step of wearing the smart display device, for example, inside the driving cab of the vehicle;
- block 103 illustrates the possibility of connecting, for example via Wi-Fi, the smart display device to the electronic control unit of the vehicle;
- block 104 illustrates the step of processing the data detected by the vehicle sensors and displaying the load diagram on the lens of the smart display device;
- block 106 illustrates the end of the operating steps of driving the vehicle.

In one or more embodiments, in association with the load diagram, the smart display device 19 is further configured and programmed to display further operating parameters, including:

- ground outreach of the load;
- lifting angle of the telescopic arm;
- height of the load from the ground;
- name of the installed tool;
- load placement point on the diagram with side view; and
- load placement point on the diagram with plan view.

Of course, without prejudice to the principle of the invention, the details of construction and the embodiments may vary widely with respect to those described and illustrated purely by way of example, without departing from the scope of the present invention, as determined by the attached claims.

The invention claimed is:

1. A multifunctional lifting vehicle comprising:

a base frame, a lifting assembly including at least one operating arm equipped with an attachment for mounting a tool, a drive system for activating said lifting assembly, a control system associated with said drive system, wherein said control system comprises an electronic control unit operatively connected to a plurality of sensors arranged to acquire a plurality of vehicle stability data, including a position of the at least one operating arm with respect to the base frame and a mass of a lifted load, wherein said vehicle further comprises a smart display device made in a form of smart glasses wearable by an operator who controls the vehicle, said smart display device being operationally connected to said electronic control unit, said smart display device being configured and programmed to receive said plurality of vehicle stability data from the electronic control unit and to display a load diagram in real time during use of the vehicle, wherein said load diagram displayed by the smart display device schematically illustrates an operative work area for controlling the vehicle in safety, in such a way that the operator who controls the vehicle is constantly informed in real time on a state of stability of the vehicle by the display of the load diagram, without risking certain maneuvering errors from reading the load diagram on devices misaligned with respect to the operator's field of vision who observes a scenario outside the vehicle while controlling the vehicle, wherein the smart display device is configured and programmed to display one or more of the following operating parameters:

ground outreach of the load;

lifting angle of the at least one operating arm;

height of the load from the ground;

name of a mounted tool;

load placement point on the load diagram with side view; and load placement point on the load diagram with plan view; and wherein the information displayed by the smart display device can be set by the operator.

2. The multifunctional lifting vehicle according to claim 1, wherein the smart display device comprises an electronic processor operatively in communication with the electronic control unit of the vehicle, configured and programmed to process the plurality of vehicle stability data received and autonomously determine the vehicle load diagram to be displayed.

3. The multifunctional lifting vehicle according to claim 1, wherein the electronic control unit is configured and programmed to preliminarily generate the load diagram, and the smart display device is programmed to acquire a result of processing carried out by the electronic control unit, and display the load diagram.

4. The multifunctional lifting vehicle according to claim 1, wherein the smart glasses comprise a frame wearable by the operator, which supports at least one lens for displaying the load diagram.

5. The multifunctional lifting vehicle according to claim 1, wherein said plurality of sensors comprise a load sensor configured for providing an indication of an intensity of the load applied to the at least one operating arm, and further sensors respectively detecting an inclination angle of the at least one operating arm and an extension length of a telescopic portion of the at least one operating arm.

6. The multifunctional lifting vehicle according to claim 5, wherein said base frame comprises front and rear support means, said plurality of sensors comprising an additional sensor to detect the load on said support means.

7. The multifunctional lifting vehicle according to claim 1, wherein said plurality of vehicle stability data includes a piece of information relating to a type of tool mounted on said attachment, the control system comprising a recognition unit configured for recognizing the type of tool and sending relative information to the electronic control unit.

8. A method for displaying data relating to stability of a multifunctional lifting vehicle comprising:

providing a lifting vehicle according to claim 1, connecting the smart display device to the electronic control unit of the vehicle, placing the smart display device on a head of an operator who controls the vehicle, displaying the load diagram of the vehicle by means of said smart display device, in real time during controlling of the vehicle, in such a way that the operator who controls the vehicle is constantly informed in real time on the state of stability of the vehicle by the display of the load diagram, without risking certain maneuvering errors from reading the load diagram on devices misaligned with respect to the operator's field of vision who observes the scenario outside the vehicle while controlling the vehicle.

9. The method according to claim 8, wherein said vehicle is arranged to be remotely controlled by the operator positioned outside a control cab of the vehicle, and comprising the step of remotely controlling the vehicle continuing to check in real time the load diagram displayed by the smart display device.

* * * * *